United States Patent [19]
Laura et al.

[11] Patent Number: 4,718,942
[45] Date of Patent: Jan. 12, 1988

[54] THIXOTROPIC OVERBASED ALKALINE EARTH METAL INORGANIC-ORGANIC COMPOSITIONS CONTAINING ALKOXYLATED OXIDIZED PETROLATUMS

[75] Inventors: Paul E. Laura, Southport, Conn.; Gerard Vinches, Seine Maritime, France

[73] Assignee: Witco Corporation, New York, N.Y.

[21] Appl. No.: 763,518

[22] Filed: Aug. 8, 1985

[51] Int. Cl.$^4$ ............................ C04B 9/02; C09K 3/00
[52] U.S. Cl. ............................ 106/14.29; 106/14.38; 106/14.43; 260/410.6; 252/389.6; 252/389.61; 252/33
[58] Field of Search ............ 260/410.6; 106/14.29, 106/14.38, 14.43; 252/389.6, 389.61, 33, 52 A

[56] References Cited

U.S. PATENT DOCUMENTS

| | | | |
|---|---|---|---|
| 2,433,572 | 12/1947 | McCarthy et al. | 106/14.29 |
| 2,739,129 | 3/1956 | Benbury et al. | 106/14.29 X |
| 2,911,309 | 11/1959 | Rudel et al. | 106/14.29 X |
| 2,978,423 | 4/1961 | Tirtiaux et al. | 106/14.29 X |
| 3,004,917 | 10/1961 | Fefer | 252/389.61 X |
| 3,086,870 | 4/1963 | Sheldahl et al. | 106/14.29 X |
| 3,453,124 | 7/1969 | Wurstner | 106/14.26 |
| 3,492,231 | 1/1970 | McMillen | 252/33 |
| 3,565,672 | 2/1971 | Adams | 428/467 |
| 3,565,843 | 2/1971 | Kassinger | 524/166 |
| 3,654,156 | 4/1972 | Ishii et al. | 252/49.5 |
| 3,661,622 | 5/1972 | Rogers | 428/467 |
| 3,746,643 | 7/1973 | Rogers | 252/33 |
| 3,816,310 | 6/1974 | Hunt | 252/32.7 HC |
| 3,872,048 | 3/1975 | Brown | 252/389.61 |
| 4,138,347 | 2/1979 | Crawford | 252/33 |
| 4,150,192 | 4/1979 | Downey | 252/33 X |
| 4,224,170 | 9/1980 | Haugen | 252/33 X |
| 4,495,225 | 1/1985 | Ciuba et al. | 106/14.29 X |

OTHER PUBLICATIONS

Anon., *Specialty Chemicals*, May, 1982—"Lar--Chem-Specialty Chemicals Manufacture" (3 pp.).
"SACI" Technical Bulletin Sheets for SACI-200 & SACI-200A; SACI 300-A; SACI 445-W; SACI 700; SACI-2400, SACI-2452; SACI-2460.

*Primary Examiner*—Teddy S. Gron
*Assistant Examiner*—Matthew A. Thexton
*Attorney, Agent, or Firm*—Sidney Wallenstein

[57] ABSTRACT

Corrosion-inhibiting compositions, having improved corrosion- or rust-inhibiting properties, comprising a mixture including a thixotropic greaselike overbased alkaline earth metal organic sulfonate composition and minor proportions of alkoxylated, particularly ethoxylated and/or propoxylated, oxidized petrolatums, as corrosion inhibitors, said compositions being especially characterized by low water absorption properties.

22 Claims, No Drawings

4,718,942

THIXOTROPIC OVERBASED ALKALINE EARTH METAL INORGANIC-ORGANIC COMPOSITIONS CONTAINING ALKOXYLATED OXIDIZED PETROLATUMS

DESCRIPTION

1. Technical Field

The present invention is directed to the preparation of novel corrosion-inhibiting coating compositions which are effective, when applied in thin films, for the prevention or inhibition of corrosion or rusting of ferrous and non-ferrous metals which are susceptible to corrosion or rusting. The corrosion-inhibiting compositions of this invention (hereafter, for convenience, sometimes called "coating compositions") comprise formulations which contain, as essential ingredients, inorganic-organic complexes, in the form of thixotropic overbased alkaline earth metal organic sulfonates complexed with alkaline earth metal carbonates, in admixture with minor proportions of alkoxylated, particularly ethoxylated or propoxylated or ethoxylated-propoxylated oxidized petrolatums. In their most advantageous or important embodiments, said coating compositions contain one or more additional ingredients, particularly more than one, selected from the group of waxes such as crude or refined microcrystalline waxes (non-oxidized or oxidized); petrolatums, oxidized petrolatums, asphalts and other additives. Said coating compositions can be in the form of (a) volatile organic solvent-based systems; (b) nonvolatile mineral oil-based systems; and (c) mixed volatile organic solvent - nonvolatile mineral oil-based systems. The thixotropic overbased alkaline earth metal organic sulfonates are advantageously derived from alkyl benzene sulfonic acids in which alkyl contains from 12 to 22 carbon atoms. These thixotropic overbased organic sulfonates comprise, most advantageously, complexes of calcium organic sulfonates with calcium carbonate. Those thixotropic overbased alkaline earth metal organic sulfonates which are particularly useful in the production of the coating compositions of our invention have base numbers of about 200 to about 300; or, stated in terms of their metal ratios, they have metal ratios of at least 4.5, and, particularly, in the range of about 7 to about 12. The coating compositions of this invention have the important advantages of possessing excellent corrosion-resistant properties, as demonstrated by salt fog test results, and by being particularly resistant to fresh water degradation.

2. Background Prior Art

Over a period of a great many years, numerous coating compositions have been proposed, and many of which have been used commercially, for the coating of ferrous and non-ferrous metals, which are susceptible to rust or corrosion, to prevent or to inhibit such rust or corrosion. As has long been known, rust or corrosion is caused by environmental conditions, such as contact of the metal surfaces by water; by air, particularly moist air; and by various chemicals or other materials which come into contact with the metal surfaces. While, in most cases, ferrous metals such as iron and steels represent the areas where rust and corrosion problems are particularly encountered, various non-ferrous metals, for instance, aluminum, are also subject to corrosion.

Since the coating compositions of our present invention are of the type which involve the use of inorganic-organic complexes which, as noted above, comprise thixotropic overbased alkaline earth metal organic sulfonates complexed with inorganic alkaline earth metal carbonates, as one of the essential ingredients of said coating compositions, it is to be noted that the prior art has long known of such inorganic-organic complexes, and of corrosion-inhibiting coating compositions which contain, as one of the ingredients thereof, the aforesaid inorganic-organic complexes.

The use as corrosion-inhibiting coating compositions, which contain thixotropic, or grease-like or gel-like thixotropic, alkaline earth metal organic sulfonates complexed with alkaline earth metal carbonates, with or without admixture with polymers, resins, or waxes, in a carrier or diluent of nonvolatile or volatile (or mixtures of nonvolatile and volatile) hydrocarbons and/or other liquid solvents, is well-known to the art and is disclosed in such U.S. Pat. Nos. 3,453,124; 3,492,231; 3,565,672; 3,565,843; 3,661,622; 3,746,643; and 3,816,310; and various patents referred to in the specifications of such patents. Various of such corrosion-inhibiting compositions are known to have a certain utility for a variety of purposes, some including automobile and truck body undercoatings, and others for use in other environments.

U.S. Pat. No. 3,453,124 discloses, among other things, the preparation of inorganic-organic complexes in the form of thixotropic overbased alkaline earth metal (such as calcium) organic sulfonates complexed with alkaline earth metal (such as calcium) carbonates, dispersed, in the form of colloidal particles, in oil carriers such as mineral oils or other nonvolatile carriers or media, as well as other carriers or media which are volatile, such as mineral spirits, and, also, mixtures of nonvolatile and volatile carriers or media. It also discloses corrosion-inhibiting coating compositions for the treatment of ferrous and nonferrous metals which comprise, as essential components of the invention of said patent, reaction products of the aforesaid inorganic-organic complexes, colloidally dispersed in said carriers or media, with phosphoric acid esters of alcohols. In Column 40, Lines 48-75, of said patent, it is stated that particularly useful corrosion-inhibiting compositions are obtained when certain types of hydrocarbon resins are added to the aforesaid reaction products, in that said resins impart to the coating compositions the property of forming coatings on the metals which are firm rather than being soft and greasy, firm coatings being advantageous because they provide additional resistance to abrasion, dirt pickup, gravel pickup, etc.; and they avoid the disadvantages of soft grease-like coatings which are easily removed by contact of such coatings by humans and animals.

The said U.S. Pat. No. 3,453,124 also discloses, in Columns 43 and 44, the results of comparative corrosion tests with illustrative corrosion-inhibiting compositions of said patent and with commercial automobile undercoating compositions, which latter includes a petrolatum undercoating composition; an undercoating composition comprising SAE 40 oil, a rust inhibitor, and a drying oil; a petroleum base translucent film; and an asphalt cutback undercoating composition; in which comparative tests of corrosion-inhibiting compositions made in accordance with the claimed invention of said patent are shown to be superior.

U.S. Pat. No. 3,492,231 discloses methods for the preparation of the inorganic-organic complexes, which can be used to prepare the novel corrosion-inhibiting compositions of the present invention, and also their utility in the production of corrosion-inhibiting compositions for use on metals.

U.S. Pat. No. 3,565,672 discloses methods for the preparation of mineral oil solutions of inorganic-organic complexes, which complexes are of the type which are used in accordance with the present invention, and their utility as corrosion-inhibitors.

U.S. Pat. No. 3,565,843 discloses organic rust-inhibiting compositions which form hard coatings which are almost tack-free to the touch by spraying on metal surfaces, which compositions comprise (a) about 15 to 35 wt. % of an inorganic-organic complex in the form of an overbased alkaline earth metal organic sulfonate which has been admixed with aqueous ammonia under conditions to form a gel, which is, in fact, a thixotropic gel; (b) about 5 to 15 wt. % of a coating material selected from the group consisting of a hydrocarbon polymer resin and a combination of a hydrocarbon polymer resin, an ethylene-vinyl acetate copolymer having a specified melt index, and a wax, and wherein said hydrocarbon polymer resin has a specified molecular weight and a specified softening point; and (c) about 55 to 85 wt. % of a hydrocarbon solvent having a boiling point range of about 270° to 450° F.

U.S. Pat. No. 3,661,622 discloses, among other subject matter, the preparation of thixotropic overbased alkaline earth metal, particularly calcium, organic sulfonates, complexed with an alkaline earth metal, particularly calcium, carbonate; the admixture therewith of certain polymers such as low density polyethylene, polypropylene, etc.; copolymers of the foregoing with vinyl monomers such as ethylene-vinyl acetate; polymethyl methacrylate and others; and the preparation of corrosion-inhibiting primer coating compositions containing the aforesaid ingredients. The inclusion of the polymers, as is pointed out in Column 11, Lines 45-65, serves, among other functions, to produce films which are harder, tougher and less tacky than primer compositions which do not contain such polymers. The primer compositions are stated to be desirably applied to metal surfaces to be coated in the form of a volatile organic solvent solution, said primer composition solution being applied by brush coating or by spraying, and evaporating the volatile organic solvent from the primer composition film, after which a conventional paint is applied.

U.S. Pat. No. 3,746,643 discloses viscous, high melting point corrosion or rust-inhibiting coating compositions for metals which comprise a solution in a volatile hydrocarbon solvent, such as Stoddard solvent, which solution may also contain some mineral oil, of an inorganic-organic complex in the form of a thixotropic overbased alkaline earth metal organic sulfonate complexed with an alkaline earth metal carbonate, and which coating composition contains certain proportions of microcrystalline wax. The novelty in this patent resides in the incorporation of microcrystalline wax into the composition, which imparts an unexpected marked increase in the resistance to rusting of dip-coating steel panels, as demonstrated by Weatherometer testing, over similar coating compositions not containing microcrystalline wax, or over similar coating compositions containing ordinary paraffin waxes.

U.S. Pat. No. 3,816,310 discloses methods for the preparation of coating compositions which have the particular utility as rust-inhibitors, as well as rust-inhibitor greases. This patent discloses methods of preparing inorganic-organic complexes in the form of thixotropic overbased alkaline earth metal, particularly calcium, organic sulfonates, complexed with an alkaline earth metal, particularly calcium, carbonate, dissolved or dispersed in a nonvolatile carrier, such as mineral oils, or a volatile organic solvent, such as Stoddard solvent, or a mixture of nonvolatile carriers and volatile organic solvents. Compositions made in accordance with this patent can be applied, by spraying or painting, to a metal surface to coat said surface and protect it against rusting, and it is stated that such compositions have particular utility for rust-proofing automobile underbodies.

There has also been disclosed, in various published Technical Data sheets dealing with so-called "SACI" [1] products, typical formulations and applications thereof as corrosion-inhibiting coating compositions, with respect to products identified as "SACI"-100 and 100A, "SACI"-200 and 200A, "SACI"-300 and 300A, "SACI" 445-W, "SACI" 450-W Base, "SACI" 700, "SACI" 760, "SACI"-2400, "SACI"-2452 and "SACI"-2460. Such "SACI" products contain a thixotropic overbased calcium organic sulfonate complexed with calcium carbonate colloidally dispersed in a volatile hydrocarbon solvent (mineral spirits), or in a paraffinic mineral oil, or in a mixture of said mineral spirits and said mineral oil. The organic sulfonate part of the thixotropic overbased calcium organic sulfonate-calcium carbonate complexes of the aforesaid "SACI" products is derived from the use of branch chain alkylbenzene sulfonic acids comprising a mixture of monoalkyl- and dialkyl-benzene sulfonic acids, with the dialkylbenzene sulfonic acids predominating alkyl containing predominately from 12 to 15 carbon atoms, although numerous other sulfonic acids can be used in the production of "SACI"-type products, as is apparent from the foregoing patents.

[1] "SACI" is a registered trademark owned by Witco Corporation, New York, N.Y., the assignee of the present application.

"SACI"-100 and 100A concentrates are colloidal dispersions of said complex in a mixture of mineral spirits and a paraffinic mineral oil. "SACI"-100A also contains oxidized petrolatum for improved anti-corrosion properties. "SACI"-100 contains 60, 50 or 40 wt. % solids, depending on its content of mineral spirits. Coatings made with its listed basic composition may be formulated with waxes (refined and unrefined); petrolatums; oxidized petrolatums, those having an Acid No. of 15-20 being recommended; pigments; resins; and asphalts. Coatings made with "SACI"-100 and 100A concentrates are stated to produce films which are soft, oily and self-healing. Salt fog tests on "SACI"-100 and 100A show 500 hours to failure for "SACI"-100 and 600 hours to failure for "SACI"-100A with a dry film thickness of 0.5 mil; 1000 hours to failure for "SACI"-100, and 1200 hours to failure for "SACI"-100A with a dry film thickness of 1.0 mil.

"SACI"-200 and 200A are colloidal dispersions of said complex in a paraffinic mineral oil. "SACI"-200 contains 36 wt. % of said complex and 64 wt. % mineral oil. "SACI"-200A also contains oxidized petrolatum. The other statements made as to "SACI"-100 and 100A are applicable to "SACI"-200 and 200A.

"SACI"-300 is a colloidal dispersion made by adding to "SACI" 700 (discussed below) a microcrystalline wax and a paraffinic mineral oil to produce a product containing 35 wt. % of said complex, 37 wt. % of mineral spirits, 12% of a paraffinic mineral oil, and 16 wt. % of a microcrystalline wax to provide a corrosion-inhibiting composition which is stated to have exceptional protection properties in salt water immersion and salt atmospheres; that typical applications include outdoor parts storage, automobile body rust protection, coatings for underground pipe, marine applications and protection of overseas shipments; that "SACI" 300 wax-like coatings can be used in organic solvent dilutions or in combination with asphalts or petrolatums where long-term protection and relative ease of removal are important; and that the films resulting from using the basic formulations of SACI are firm and waxy. "SACI"-300A is similar to "SACI"-300; but it also contains oxidized petrolatum. Salt fog tests on "SACI"-300 and "SACI"-300A show, among other thicknesses of dry films, 300+ hours to failure for "SACI"-300 with an 0.5 mil dry film thickness and 800+ hours to failure with "SACI"-300A with the same film thickness; and, where the film thickness is 1.0 mil, 800+ hours to failure for "SACI"-300 and 1500+ hours to failure for "SACI"-300A. With films of 5.0 mil thickness, "SACI"-300 showed failure after 2000+ hours, and "SACI"-300A showed failure at 3000+ hours.

Other commercial "SACI" products are, as noted above, "SACI"-2400, "SACI"-2452 and "SACI"-2460. These "SACI" products are all corrosion-preventive concentrates in the form of mineral spirits-wax colloidal dispersions. They are stated to have a high content of the thixotropic inorganic-organic complex (65 wt. % solids in "SACI"-2400, 52 wt. % in "SACI"-2452, and 60 wt. % solids in "SACI"-2460). They are stated to be capable of being formulated with both refined and unrefined waxes, petrolatums and oxidized petrolatums, resins, polymers, asphalts, oils, and aliphatic and aromatic solvents to achieve virtually any solids, activity and/or viscosity level desired. Salt fog data are presented utilizing dry film thicknesses of 0.5 mil and 1.0 mil, hours to failure with 0.5 mil being 500, and hours to failure with 1.0 mil being 1100.

"SACI" 700 is a colloidal dispersion of said complex in mineral spirits, the solids content of which, namely, the thixotropic overbased complex, is substantially 50 wt. %, and the mineral spirits content of which is substantially 50 wt. %. It is stated in "SACI" 700 Technical Data sheets that the "SACI" 700 should not be used alone as a rust prevention coating but should be used with additional oil, petrolatum, wax and mastic to produce a variety of effective coatings.

Another "SACI" product is "SACI" 760, which is a colloidal dispersion in mineral spirits of a thixotropic overbased calcium organic sulfonate complexed with calcium carbonate. Said "SACI" 760 product contains 60 wt. % of said complex and 40 wt. % of mineral spirits. The organic portion of said organic sulfonate is derived from a linear alkylbenzene sulfonic acid in which the linear alkyl radical contains predominately 12 to 15 carbon atoms and the alkylbenzene is a mixture of predominately mono- and di-alkylbenzenes, the dialkylbenzenes predominating over the monoalkylbenzenes.

It has also been known to the art, as disclosed in an article entitled "CarChem-Specialty Chemicals Manufacturers", published in the May, 1982 issue of "Specialty Chemicals", in which reference is made to the production by Carless Chemicals Trading Ltd. (hereafter "CarChem") of long chain fatty acids prepared by oxidation of certain oxidized waxes, which fatty acids are subject to be being (i) saponified, (ii) esterified, or (iii) ethoxylated. It is further stated that said oxidized waxes are widely used in the preparation of both oil-soluble (zinc, barium, calcium) and water-soluble (ammonium, amine, sodium) soaps. Reference is made that, by a novel process employed by CarChem (which process is not disclosed) calcium soaps are prepared having a high melting point and possessing a platelet structure which is of value in the formulation of protective coatings and rust preventives in that very low moisture vapor transmissions at correspondingly low film thicknesses can be achieved. This article, and the products described therein is impertinent to our invention in that, among other things, it fails to disclose or suggest the production of calcium soaps prepared, somehow or other, from ethoxlated petroleum-derived waxes. Furthermore, and apart from other considerations, it provides no disclosure or suggestion of corrosion-inhibiting compositions of our invention in which (a) an inorganic-organic complex in the form of a thixotropic overbased alkaline earth metal sulfonate is admixed with a minor proportion of an ethoxylated oxidized petrolatum.

SUMMARY OF THE INVENTION

The present invention is based on discoveries that improved corrosion-inhibiting coating compositions can be obtained which are not only characterized by excellent corrosion-inhibiting properties but, also, have the advantage of being substantially resistant or having a substantially enhanced resistance to water absorption, particularly fresh water absorption. This is accomplished by incorporating into thixotropic overbased alkaline earth metal, particularly advantageously calcium, organic sulfonates, such as have been described above, minor proportions of alkoxylated oxidized petrolatums, particularly ethoxylated or propoxylated or ethoxylated-propoxylated oxidized petrolatums, and which also, advantageously, contain one or more various additives such as, for instance, microcrystalline waxes, oxidized or unoxidized, petrolatums, oxidized petrolatums, paraffin waxes, and other additives which, where used, are commonly employed in proportions between about 5% and 20%, by weight, of the coating compositions of our invention, preferably from about 10 to about 15%.

No novelty is claimed in the alkoxylated or, more specifically, in the ethoxylated and/or propoxylated oxidized petrolatums per se because such products are known to the art. They are disclosed, for instance, in U.S. Pat. Nos. 3,654,156 (see Example 4 in Column 7 thereof), where they are utilized as lubricants in the cold rolling of steel such as sheet steel, as substitutes for palm oil to overcome various deficiencies of palm oil as lubricants previously used in the cold rolling of steel such as steel sheets. Such use of alkoxylated oxidized petrolatums as lubricants for the cold rolling of steel is radically different from and unrelated to their utilization as corrosion-inhibiting agents in coating compositions comprising thixotropic overbased alkaline earth metal sulfonates and in the overall properties and utilities obtained thereby. In short, U.S. Pat. No. 3,654,156 is irrelevant to the purposes, uses, teachings and objectives of our present invention.

It is to be understood that, generally speaking, and so far as we are aware, the novel corrosion-inhibiting compositions of the present invention constitute a definite improvement in one or more respects over coating compositions which have heretofore been prepared utilizing inorganic-organic complexes, as exemplified by thixotropic overbased alkaline earth metal organic sulfonates or by coatings prepared from the heretofore-marketed "SACI" corrosion- or rust-inhibiting or preventive concentrate compositions, such as the various "SACI" products mentioned above, and other "SACI" concentrate compositions. Coating compositions heretofore made from or utilizing said "SACI" concentrates, to be sure, have excellent performance characteristics when used for various protective purposes. However, such "SACI" corrosion-inhibiting compositions have been found to be lacking in certain properties to reasonably meet certain requirements, especially where problems have arisen in regard to resistance to water absorption by such known compositions.

No novelty is claimed by us in corrosion- or rust-inhibiting coating compositions which comprise colloidal dispersions of thixotropic overbased alkaline earth metal organic sulfonates in volatile organic solvents, or in nonvolatile mineral oils, or in mixtures of volatile organic solvents and nonvolatile mineral oils, which compositions also contain petrolatums, or oxidized petrolatums, or microcrystalline waxes, or asphalts or other analogous additives, except to the extent that there is incorporated into such compositions alkoxylated oxidized petrolatums which are present in amounts such as to enhance the corrosion-inhibiting properties where such corrosion-inhibiting properties are not already at a suitable level, and where said alkoxylated oxidized petrolatums are such as to effect a definitely meaningful reduction in resistance to degradation of the coating compositions in fresh water or under fresh water environmental conditions.

DETAILED DESCRIPTION

In accordance with our present invention, as has been generally indicated above, the surprising and unexpected discoveries have been made that, in thixotropic overbased alkaline earth metal organic sulfonate corrosion-inhibiting compositions in which there are incorporated minor proportions of $C_2$-$C_8$ alkoxylated, particularly ethoxylated and/or propoxylated, oxidized petrolatums, within certain limits, as pointed out below, not only is there achieved a decided improvement in corrosion- or rust-inhibition over that which results from the use of oxidized petrolatums as such, but, also, importantly, a significant improvement is obtained in regard to a reduction in the amount of water absorption by the utilization of said alkoxylated oxidized petrolatums, in coatings utilizing the aforesaid thixotropic overbased alkaline earth metal organic sulfonate corrosion-inhibiting compositions. This improvement is especially important in those environments in which the corrosion-inhibiting compositions are used as protective coatings in the form of thin films, such as those of 0.1 to 0.5 mils, on metal surfaces, notably ferrous metal surfaces such as iron and steel surfaces. It will be understood, of course, that the novel compositions of the present invention can be used as coatings having materially greater thicknesses as, for example, of the order of 5 or 6 mils or more. The exact reason or reasons why the alkoxylated oxidized petrolatums so function in the environment here involved is not actually or fully known.

Generally speaking, in many corrosion-inhibiting coating compositions which contain thixotropic overbased alkaline earth metal, usually calcium, organic sulfonates containing one or more of such additives as asphalts, petrolatums, oxidized petrolatums, and microcrystalline waxes, said coatings thereof on metal surfaces provide unsatisfactory performance where said coatings are used in a fresh water environment or come into contact with fresh water. Tests carried out under the foregoing conditions have shown that the aforesaid coatings tend to become bloated, which causes loss of adhesion of the coatings to the metals coated therewith, with the result that the coating fails. It has been thought, though by no means fully established, that, under the foregoing conditions, the coatings are exposed to what may be characterized as a hypotonic effect. The concentration of electrolytes, such as metal salts present in the aforesaid coatings, is commonly much lighter than in fresh water media. The resultant effect or action, under such circumstances, is that fresh water tends to diffuse into the coating to seek to equalize the electrolyte imbalance. This problem appears to be potentially exacerbated in situations where, as here, the coating compositions contain thixotropic overbased alkaline earth metal organic sulfonates. Any excess metal salt in the coating compositions increases the difference in concentration levels of electrolytes between the aforesaid coatings and fresh water media. Whatever the actual reasons may be for the foregoing results, we have established that the corrosion-inhibiting compositions of our invention containing controlled proportions of alkoxylated oxidized petrolatums significantly reduces the amount of absorption of fresh water into the coatings, and plays an important role in maintaining the integrity of the coatings under fresh water conditions. By way of contrast, exposure of the aforesaid coatings to salt water does not appear to cause a deleterious effect on said coatings. It is thought that the reason for this is that the electrolyte equilibrium is in an isotonic balance because of the distinctly higher salinity present in salt water, as opposed to that of fresh water. By "fresh water", we mean water which is substantially free of any material proportions of electrolytes such as, for instance, metal salts.

Since, broadly speaking, alkoxylated oxidized petrolatums and methods for their preparation, are already known to the art, as indicated above, no general description with respect thereto is required. While various methods can be used, it is generally preferred to react the oxidized petrolatums with alkylene oxides, particularly ethylene oxide or propylene oxide or mixtures of ethylene oxide and propylene oxide. However, with due respect thereto, several considerations come into play from the standpoint of optimal results and scope of the subject matter which constitutes reasonable areas of utility.

Considering, first, the matter of the oxidized petrolatums which are used from which the alkoxylated oxidized petrolatums are prepared, it may again be noted that the oxidized petrolatum starting materials are, as previously noted, well-known per se to the art, and they are articles of commerce and are manufactured and sold by various companies. As is well-known, oxidized petrolatums are, generally, mixtures of organic acids, oxyacids, lactones, esters and some unsaponifiable matter. They vary from one another in molecular weight (determined by the petrolatum selected) and the extent of oxidization. Illustrative are those sold by ALOX Corporation under various ALOX numbers such as, for instance, ALOX Nos. 100D, 600 and 601. Certain commercial oxidized petrolatums are sold under the trade designation OXPET, an illustrative one being identified as OXPET WH-1. Those oxidized petrolatums where the extent of oxidation is such as to provide acid numbers in the range of about 10 to about 60, particularly about 15 to about 25, it being especially desirable to utilize those having the lower range of acid numbers such as about 15 to about 20, for the preparation of the ethoxylated and/or propoxylated oxidized petrolatums are particularly useful in the coating compositions of the present invention. While the petrolatums from which the starting oxidized petrolatums are derived are most advantageously natural petrolatums, that is, those produced from petroleums, the starting oxidized petrolatums can also be utilized which are derived from synthetic petrolatums. Where reference is made in the claims to oxidized petrolatums, it will, therefore, be understood to encompass oxidized petrolatums wherein the petrolatums, prior to being oxidized, are derived from natural sources. Oxidized synthetic petrolatums will be understood to mean petrolatums which, prior to being oxidized, are derived from synthetic petrolatums.

Next, consideration is to be given to the matter of the extent of alkoxylation of the oxidized petrolatum and the particular alkylene oxides used to produce the alkoxylated oxidized petrolatums. As to the alkylene oxides or epoxides or α-epoxides utilized, ethylene oxide and propylene oxide are of particular utility, whether used individually or in admixture or sequentially, in alkoxylating the oxidized petrolatums. Generally speaking, the propoxylated oxidized petrolatums are somewhat more effective than the ethoxylated oxidized petrolatums as to salt fog performance but not sufficiently to make any particularly material difference. From the standpoint of the effect on water absorption by the coating compositions of our invention, the results are generally somewhat enhanced when propylene oxide is used in place of ethylene oxide in the preparation of the alkoxylated oxidized petrolatums. In the broader aspects of our invention, where the alkylene oxides used contain, for instance, from 2 to about 8 or more carbon atoms, such as butylene oxide, pentylene oxide, hexylene oxide, octylene oxide, or styrene oxide, the resulting alkoxylated oxidized petrolatums, apart from the fact that they are less economical than ethylene oxide or propylene oxide, tend to possess even greater advantages in respect to their efficacy in resistance to fresh water absorption than the ethoxylated and/or propoxylated oxidized petrolatums, but from an overall standpoint are not as desirable as the ethoxylated and/or propoxylated oxidized petrolatums.

Another factor that is involved is that, where the extent or amount of alkoxylation is unduly high, the effectiveness thereof in the coating compositions of the present invention, with respect to fresh water absorption, while generally increasing with increasing amounts of alkoxylation, tends to level off after the increased amounts reach a certain stage. The respective relative amounts of (a) the alkoxylating agent, as exemplified particularly by ethylene oxide and/or propylene oxide, and (b) the oxidized petrolatums which are reacted to produce the alkoxylated oxidized petrolatums, are variable. Generally speaking, in terms of molar proportions, from about 2 to about 15 or more moles of the ethylene oxide or propylene oxide are reacted with 1 mole of the oxidized petrolatums, with a preferred range of about 4 to 10 moles of said alkylene oxide to 1 mole of the oxidized petrolatums. Where alkylene oxides containing from 4 to 8 or more carbon atoms are utilized, simple routine tests can be preliminarily carried out to produce alkoxylated oxidized petrolatums, using variable mole ratios of such alkoxylated oxidized petrolatums which can then be incorporated in given or preselected proportions in coating compositions containing the thixotropic overbased alkaline earth metal organic sulfonates and suitable selections made by testing such compositions for their particular effectiveness, through salt fog tests and tests for resistance to fresh water absorption by coatings of such coating compositions, all within the guidelines and teachings of the present invention.

While increasing mole ratios of the alkoxylating agent per mole of oxidized petrolatums generally results in increasing the corrosion- or rust-inhibiting effects of the coating compositions of the present invention, beyond a certain limit, depending upon various factors, the corrosion- or rust-inhibiting effects tend to stabilize or diminish somewhat. On the other hand, in regard to fresh water absorption properties, increasing mole ratios of the alkoxylating agent to the oxidized petrolatums, while generally resulting in increasing the fresh water absorption properties, a point is reached wherein increasing said mole ratios does not result in further increase in fresh water absorption properties. Furthermore, the extent of such effects tends to vary somewhat depending upon the particular thixotropic greaselike alkaline earth metal organic sulfonate compositions and the particular alkoxide and alkoxylated oxidized petrolatum employed. Given the guiding principles and teachings of the present invention, optimal results can be obtained by simple testing with any particular selected alkoxylated oxidized petrolatums in any particular coating compositions of the type with which the present invention is concerned.

In the novel thixotropic overbased alkaline earth metal organic sulfonate corrosion-inhibiting compositions of our invention, the proportions of the alkoxylated oxidized petrolatums utilized are variable within certain limits. In general, to obtain reasonable of the corrosion-inhibiting properties and reasonable reduction in the fresh water absorption of the aforementioned thixotropic overbased alkaline earth metal organic sulfonate corrosion-inhibiting coating compositions, such compositions should contain in the range of about 12 to about 20 wt. % of the alkoxylated oxidized petroleums, a particularly preferred range being from about 13 to about 15 wt. %. Based on the weight of the thixotropic overbased alkaline earth metal organic sulfonates per se, that is, absent any organic solvent or oleaginous medium in which said sulfonates are prepared, and also absent any additives other than the alkoxylated oxidized petrolatums, the alkoxylated oxidized petrolatums will usually constitute from about 16 to about 40 wt. %, particularly advantageously from about 18 to 25 wt. %, of said thixotropic overbased alkaline earth metal organic sulfonates per se, To the extent that, in any given coating composition of the present invention, the incorporation of the given alkoxylated oxidized petrolatum results in a viscosity of said coating composition which is considered higher than is desired for a given coating operation, this can readily be met by adding organic solvents or volatile hydrocarbon solvents in the requisite amounts to obtain such particular viscosity as may be desired.

As illustrative of results which are achieved by the practice of our present invention are those shown by the following Table 1 in which "SACI" 300-A, described above, was used as the thixotropic overbased calcium organic sulfonate coating composition and was admixed, in each case, with about 20% of an ethoxylated or propoxylated oxidized petrolatum ("OXPET" WH 1), the Acid No. of the oxidized petrolatum being about 15, and the mole ratio of the ethylene oxide to the oxidized petrolatum and the mole ratio of the propylene oxide to the oxidized petrolatum being about 5:1, the percent of the aforesaid ethoxylated and propoxylated oxidized petrolatum being based on the weight of the finished coating composition.

|  | Salt Fog (ASTM) B117) Results Thickness of Coating | | Water Absorption* Results % Water Absorption By Weight |
|---|---|---|---|
|  | 0.5 Mils | 1.0 Mils |  |
| "SACI" 300-A with "OXPET" WH 1 | 385 hrs. | 1175 hrs. | 160.4 |
| "SACI" 300-A with ethoxylated "OXPET" WH 1 | 624 hrs. | 1800 hrs. | 10.6 |
| "SACI" 300-A with propoxylated "OXPET" WH 1 | 960 hrs. | 1980 hrs. | 7.2 |

In the following series of compositions and tests run thereon, the Alox 2269 blank is an oxidized petrolatum having an acid number of about 15. The XE-numbers stand for particular examples; et. stands for ethylene oxide; pr. stands for propylene oxide; and the numerals in parentheses indicate the mole ratios of ethylene oxide or propylene oxide, as the case may be, per mole of the oxidized petrolatum.

|  | SACI 300-A Salt Fog | | |
|---|---|---|---|
| OX-PET | 0.5 Mil | 1.0 Mil | Water Absorption |
| Alox 2269* Blank | *384 hrs. | *1176 hrs. | *160% |
| Alox 2269 Blank | 720 hrs. | 1344 hrs. | 572% |
| XE-100 et. (2.4/1) | 264 hrs. | 1848 hrs. | 42.6% |
| XE-802* et. (5/1) | *624 hrs. | *1800 hrs. | *10.6% |
| XE-998 et. (10/1) | 2040 hrs. | 2112 hrs. | 9.3% |
| XE-999 ET. (2.8/1) | 1176 hrs. | 1848 hrs. | 45.5% |
| XE-914* ET. (4.7/1) | *960 hrs. | *1968 hrs. | *7.2% |
| XE-997 PR. (6.6/1) | 2232 hrs. | 2232 hrs. | 12.4% |

*Note:
Different batch of "SACI"-700 and Alox 2269 used for these blends.

In the above series of compositions and tests run thereon, the propoxylated oxidized petrolatums exhibit more of a positive effect on salt fog performance than the ethoxylated products. The degree of alkoxylation shows improvement in salt fog as the amount of alkoxylation increases. This is most noticeable at thinner films. The improvement in water absorption varies slightly between the ethoxylated and the propoxylated oxidized petrolatums. The amount of alkoxylation also increases the effect on water absorption, but it appears to level off at higher levels. No significant differences are noted in the viscosity/non-volatile relation when compared to the blanks.

Other properties are noted. The water absorption of this product was cut in half (reduced from $\approx 16.0\%$ to $\approx 8.0\%$). The chill cycle properties using these products are significantly worsened. The viscosity growth when an ethoxylated OXPET or a propoxylated OXPET is substantially increased over compositions which do not contain alkoxylated OXPETS.

The following additional Examples of corrosion- or rust-inhibiting coating compositions made in accordance with the present invention are given by way of illustration only and not by way of limitation as numerous other compositions can readily be prepared in light of the teachings and guiding principles disclosed above. All parts listed are by weight. They include preferred embodiments of the invention. We consider Examples F and H as constituting, generally, the best embodiments of our invention of which we are presently aware. It is to be understood that compositions which function best in certain environments may not necessarily be the best when used in other environments. Overall, what has been set forth above as presently being considered the best embodiments of our invention is, generally speaking, correct.

In those Examples (Nos. E, F, G, K and L) in which reference is made to "Complex", such represents the inorganic-organic complex or, in other words, the thixotropic overbased alkaline earth metal organic sulfonate per se as is present as one of the ingredients of the above-described "SACI" products. Thus, from what has been set forth above as to composition of "SACI" 700 and "SACI" 760, the evaporation of the mineral spirits results in leaving the inorganic-organic complex per se. Where "SACI" products are used as starting materials for the preparation of the corrosion- or rust-inhibiting compositions of our invention, and where such "SACI" products contain mineral spirits and/or mineral oil, and where they contain microcrystalline wax and/or oxidized petrolatums or other such additives, these ingredients and the amounts thereof must be taken into account in arriving at any particular corrosion-inhibiting composition or formulation desired to be made in accordance with our invention by the inclusion therein of the alkoxylated oxidized petrolatums. There is, of course, no requirement whatsoever that "SACI" products as heretofore or presently commercially marketed be used as starting materials for the preparation of the corrosion- or rust-inhibiting coating compositions of our present invention. The starting thixotropic overbased inorganic-organic complexes as such, of per se, or in the form of dispersions simply of volatile and/or nonvolatile hydrocarbon or like liquid media, as indicated above, can be made as described in various of the aforementioned patents such as, for instance, U.S. Pat. Nos. 3,453,124; 3,492,231; and 3,816,310.

The order of the mixing or blending of the ingredients is not critical, any convenient orders of addition being generally satisfactory and being determined by the skill of one having ordinary skill in the art. The Acid No. refers to that of the oxidized petrolatums prior to being alkoxylated. The numbers in parentheses indicate the mole ratios of the alkoxides per mole of the oxidized petrolatums.

EXAMPLE A

|  | Parts |
|---|---|
| "SACI" 300-A | 100 |
| Ethoxylated oxidized petrolatum, Acid No. 15 (2.4) | 14 |

EXAMPLE B

|  | Parts |
| --- | --- |
| "SACI" 700 | 100 |
| Microcrystalline wax | 10 |
| Oxidized petrolatum, Acid No. 20 | 10 |
| Ethoxylated oxidized petrolatum, Acid No. 15 (4) | 15 |

EXAMPLE C

|  | Parts |
| --- | --- |
| "SACI" 100 | 100 |
| Microcrystalline wax | 8 |
| Propoxylated oxidized petrolatum, Acid No. 20 (6) | 15 |

EXAMPLE D

|  | Parts |
| --- | --- |
| "SACI" 200-A | 100 |
| Propoxylated oxidized petrolatum, Acid No. 25 (6.6) | 15 |

EXAMPLE E

|  | Parts |
| --- | --- |
| Complex | 35 |
| Mineral spirits | 40 |
| Oxidized petrolatum, Acid No. 30 | 10 |
| Ethoxylated oxidized petrolatum, Acid No. 15 (10) | 13 |

EXAMPLE F

|  | Parts |
| --- | --- |
| Complex | 35 |
| Mineral spirits | 25 |
| Paraffinic oil (200 visc) | 10 |
| Microcrystalline wax | 10 |
| Oxidized petrolatum, Acid No. 20 | 6 |
| Propoxylated oxidized petrolatum, Acid No. 15 (6.5) | 13 |

EXAMPLE G

|  | Parts |
| --- | --- |
| Complex (Thixotropic overbased magnesium organic sulfonate) | 32 |
| Mineral spirits | 25 |
| Mineral oil (Paraffinic, visc. 200) | 15 |
| Oxidized petrolatum, Acid No. 15 | 10 |

-continued

|  | Parts |
| --- | --- |
| Microcrystalline wax | 10 |
| Propoxylated oxidized petrolatum, Acid No. 15 (6) | 13 |

EXAMPLE H

|  | Parts |
| --- | --- |
| "SACI" 300-A | 100 |
| Petrolatum | 10 |
| Butoxylated oxidized petrolatum, Acid No. 15 (4) | 18 |

EXAMPLE I

|  | Parts |
| --- | --- |
| "SACI" 100 | 100 |
| Ethoxylated oxidized petrolatum, Acid No. 15 (5) | 28 |

EXAMPLE J

|  | Parts |
| --- | --- |
| "SACI" 200 | 100 |
| Ethoxylated oxidized petrolatum, Acid No. 20 (5.5) | 35 |

EXAMPLE K

|  | Parts |
| --- | --- |
| Complex | 35 |
| Mineral spirits | 25 |
| Paraffinic oil (200 visc) | 20 |
| Oxidized petrolatum, Acid No. 15 | 5 |
| Propoxylated oxidized petrolatum, Acid No. 15 (7) | 15 |

EXAMPLE L

|  | Parts |
| --- | --- |
| Complex | 35 |
| Mineral spirits | 25 |
| Paraffinic oil (200 visc) | 15 |
| Oxidized petrolatum, Acid No. 15 | 10 |
| Ethoxylated oxidized petrolatum, Acid No. 15 (6) | 15 |

We claim:

1. A corrosion-inhibiting coating composition including, as essential ingredients, (a) an inorganic-organic complex in the form of a thixotropic overbased alkaline earth metal organic sulfonate, and (b) a minor proportion of a $C_2$–$C_8$ alkoxylated oxidized petrolatum selected from the group of natural and synthetic petrolatums.

2. A composition according to claim 1, in which the alkaline earth metal is calcium.

3. A composition according to claim 2, in which the petrolatum is a natural petrolatum.

4. A composition according to claim 3, in which the alkoxylated oxidized petrolatum is selected from the group of ethoxylated oxidized petrolatums, propoxylated oxidized petrolatums, and ethoxylated-propoxylated oxidized petrolatums.

5. A composition according to claim 3, in which the thixotropic overbased alkaline earth metal organic sulfonate constitutes from about 10 to about 40 wt. % of the coating composition.

6. A composition according to claim 3, in which the acid number of the oxidized petrolatum prior to its conversion to the alkoxylated oxidized petrolatum is in the range of about 10 to about 60.

7. A composition according to claim 3, in which the acid number of the oxidized petrolatum prior to its conversion to the alkoxylated oxidized petrolatum is in the range of about 15 to about 20.

8. A composition according to claim 3, in which the alkoxylated oxidized petrolatum is produced by reacting the oxidized petrolatum with an alkylene oxide in a mole ratio of from about 2 to about 15 moles of the alkylene oxide with 1 mole of the oxidized petrolatum.

9. A composition according to claim 8, in which the mole ratio of the alkylene oxide is from about 4 to about 10 of the alkoxide to 1 of the oxidized petrolatum.

10. A composition according to claim 9, in which the alkylene oxide is a member selected from the group consisting of ethylene oxide, propylene oxide and ethylene oxide-propylene oxide.

11. A composition according to claim 10, in which the alkoxylated oxidized petrolatum constitutes from about 12 to about 20 wt. % of the coating composition.

12. A composition according to claim 11, in which the alkoxylated oxidized petrolatum constitutes from about 13 to about 15 wt. % of the coating composition.

13. A composition according to claim 10, in which the alkoxylated oxidized petrolatum constitutes from about 16 to about 40 wt. % based on the weight of the thixotropic overbased alkaline earth metal organic sulfonate per se.

14. A composition according to claim 13, in which the alkoxylated oxidized petrolatum constitutes from about 18 to about 25 wt. % based on the weight of the thixotropic overbased alkaline earth metal organic sulfonate per se.

15. A composition according to claim 4, which includes from about 12 to about 20 wt. %, based on the weight of the composition, of at least one member selected from the group of natural or synthetic petrolatum, oxidized or unoxidized; microcrystalline wax, oxidized or unoxidized; asphalt, resins and mastics.

16. A corrosion-inhibiting coating composition including, as essential ingredients, (a) an inorganic-organic complex in the form of a thixotropic overbased alkaline earth metal organic sulfonate colloidally dispersed in an inert liquid organic liquid carrier selected from the group of volatile organic solvents, nonvolatile oleaginous materials, and mixtures of said volatile organic solvents and said nonvolatile oleaginous materials, and (b) minor proportion of a $C_2$–$C_8$ alkoxylated oxidized petrolatum selected from the group of natural and synthetic petrolatums.

17. A composition according to claim 16, in which the alkaline earth metal is calcium.

18. A composition according to claim 17, in which the petrolatum is a natural petrolatum.

19. A composition according to claim 18, in which the alkoxylated oxidized petrolatum is selected from the group of ethoxylated oxidized petrolatums, propoxylated oxidized petrolatums, and ethoxylated-propoxylated oxidized petrolatums.

20. A corrosion-inhibiting coating composition comprising a mixture including a thixotropic greaselike overbased alkaline earth metal organic sulfonate, and a $C_2$–$C_8$ alkoxylated oxidized natural petrolatum, the proportions and nature of said alkoxylated oxidized natural petrolatum being such as to enhance the corrosion-inhibiting properties and to substantially reduce the resistance to degradation by fresh water of said coating composition.

21. A composition according to claim 20, in which the alkoxylated oxidized natural petrolatum is a member selected from the group of ethoxylated oxidized petrolatums, propoxylated oxidized petrolatums, and ethoxylated-propoxylated oxidized petrolatums, said alkoxylated oxidized natural petrolatums constituting from about 12 to about 20 wt. % of said composition.

22. A composition according to claim 21, which includes from about 10 to about 20 wt. % of a microcrystalline wax.

* * * * *

UNITED STATES PATENT AND TRADEMARK OFFICE
CERTIFICATE OF CORRECTION

PATENT NO. : 4,718,942

DATED : January 12, 1988

INVENTOR(S) : Paul E. Laura and Gerard Vinches

It is certified that error appears in the above-identified patent and that said Letters Patent is hereby corrected as shown below:

```
In Column 11, in the first table therein, at
approximately line 18, after the term "WH1",
and before the bold-faced line, please insert:

*Seven (7) day fresh water immersion
     of coated panels @ 40° C previously
     dried for Seventy-two (72) hours
```

Signed and Sealed this

Third Day of January, 1989

Attest:

DONALD J. QUIGG

*Attesting Officer*        *Commissioner of Patents and Trademarks*